Oct. 24, 1967 B. O. ROSAEN 3,348,695
FILTER MATERIAL

Filed July 12, 1965 2 Sheets-Sheet 1

INVENTOR.
BORJE O. ROSAEN
BY
ATTORNEYS

United States Patent Office 3,348,695
Patented Oct. 24, 1967

3,348,695
FILTER MATERIAL
Borje O. Rosaen, Ann Arbor, Mich., assignor to The Rosaen Filter Company, Hazel Park, Mich., a corporation of Michigan
Filed July 12, 1965, Ser. No. 471,295
4 Claims. (Cl. 210—489)

ABSTRACT OF THE DISCLOSURE

A filter material constructed of woven strands of a monofilament material such as nylon and in which the inlet side is roughened to increase the filtering characteristics of the material.

---

The present invention relates to fluid filter devices and more particularly to a new processed filter material for such filter elements.

Heretofore it has been recognized that nylon or similar monofilament cloth material is especially suitable for the filtering material of fluid filter elements. Such material is quite strong as compared with paper or other commonly used filter materials. It provides a filter element that is quite uniform in opening size so that rather exact specifications as to the opening size can be established. Such material has a high degree of stability with a wide variety of fluids and filter elements constructed of such material are readily cleanable.

The present invention provides a filter element constructed of a processed nylon or similar monofilament material in which the inlet side of the filter element is subjected to an abrasive or sanding process. In addition to the advantages outlined above this produces an inlet face of the filter element which is rough enough to catch smaller particles of contaminant without substantially changing the openings in the cloth. By reducing the number of particles caught within the openings the material is much easier to clean. The result is a filter element which provides the filtering action of a paper element but which is substantially stronger than paper elements and more readily cleanable than such elements.

It is an object then of the present invention to improve filter elements for fluid filtering systems and the like by providing a new filtering material for such elements comprising a monofilament cloth having the face to be disposed on the inlet side of the element roughened by sanding or a similar process.

It is yet another object of the present invention to improve filter elements constructed of nylon or similar monofilament cloth material by sanding or otherwise roughening one face of such material.

Still further objects of the present invention will readily occur to one skilled in the art to which the invention pertains upon reference to the following description of one preferred embodiment of the invention. The description makes reference to the following drawings in which like reference characters refer to like parts throughout the several views and in which FIG. 1 is a perspective side view of a filter element utilizing the preferred filtering material of the present invention.

Figure 1:
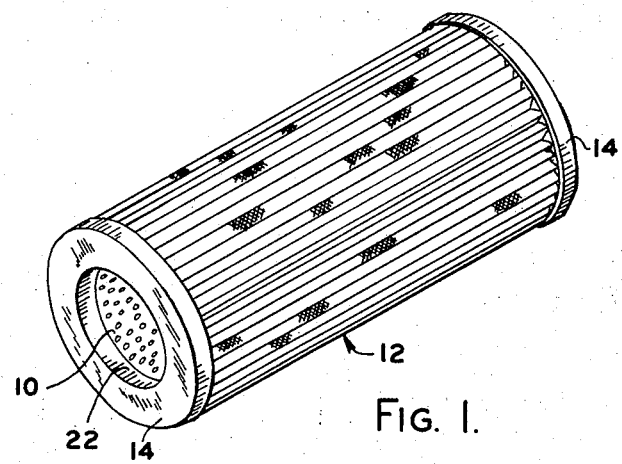

Now referring to the drawings for a more detailed description of the present invention, a preferred filter element utilizing the filtering material of the present invention is illustrated as comprising a perforated cylinder 10, a filtering member 12 and a pair of end caps 14.

Figure 2:
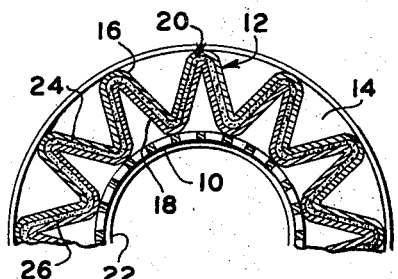
FIG. 2 is an enlarged fragmentary lateral cross-sectional view of the filter element illustrated in FIG. 1.
Figure 3:
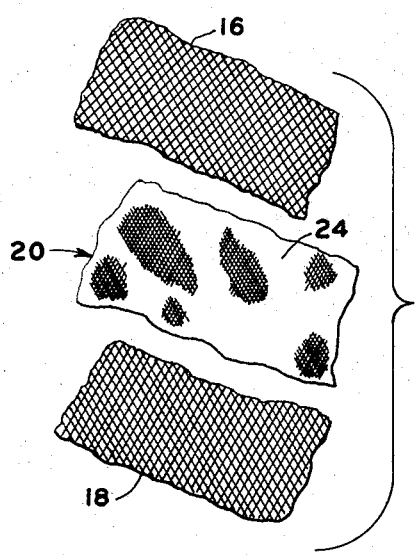
FIG. 3 is a fragmentary exploded view illustrating several parts of the filter element of the present invention.

As best illustrated in FIGS. 2 and 3, the filtering member 12 preferably comprises a first coarse mesh screen member 16, a second coarse mesh screen member 18 and a fine micron cloth member 20 which will be described in greater detail below. The cloth member 20 is preferably sandwiched between the screen members 16 and 18 and the assembled layers are then pleated to produce the cylindrical pleated form of the filtering member 12 and is then positioned overlying and encompassing the perforated cylinder 10 and the end caps 14 are bonded solidly to the assembly to form the completed filter element.

One of the end caps 14 is provided with an outlet opening 22 and the element is intended for use in the particular embodiment illustrated with the fluid to be filtered flowing radially inwardly through the screen member 16, the filtering material 20, the screen member 18, the perforated cylinder 10 and axially through the outlet opening 22. The screen members 16 and 18 and the cylinder 10 are not intended to perform a filtering function although of course they will to some degree but are provided primarily for the purpose of supporting the filtering cloth 20 and the end caps 14. The screen members 16 and 18 provide a means of maintaining the flexible and non-self supporting cloth member 20 in a fixed and pleated position so that it can perform a filtering function.

The filtering cloth 20 forms the subject matter of the present invention and will now be described in greater detail. The cloth 20 is preferably nylon or a similar monofilament cloth material and is positioned intermediate the screen members 16 and 18 to provide one surface which will be called the inlet surface 24 adjacent the screen member 16 and exposed to the incoming fluid. The opposite surface which will be called the outlet surface 26 is subjected to the fluid on the outlet side of the filter element 10 and is therefore adjacent the screen member 18.

Figure 4:
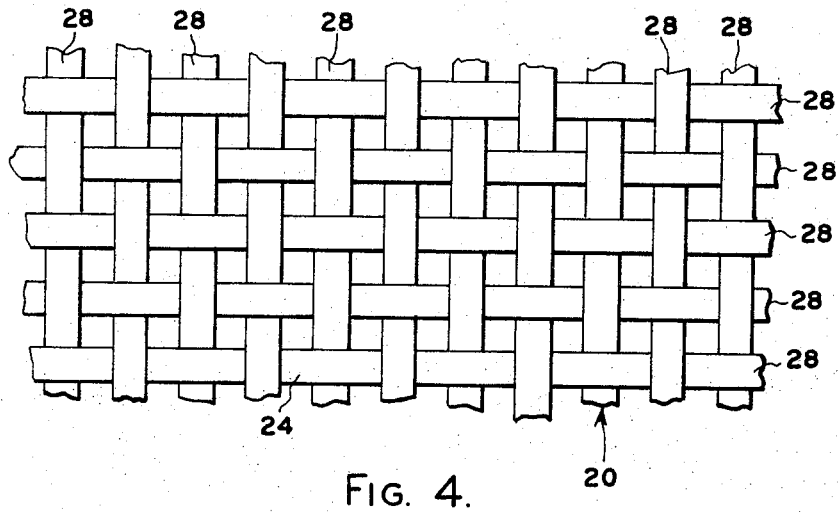
FIG. 4 is an enlarged elevational view of the filtering material of the present invention before processing.

As can best be seen in FIG. 4, filtering material constructed of nylon or similar monofilament material comprises a plurality of individual strands 28 of material woven together to produce a porous cloth. Since the material 20 is of a monofilament construction there are no loose threads within each strand and each strand is of a unitary construction.

Figure 5:
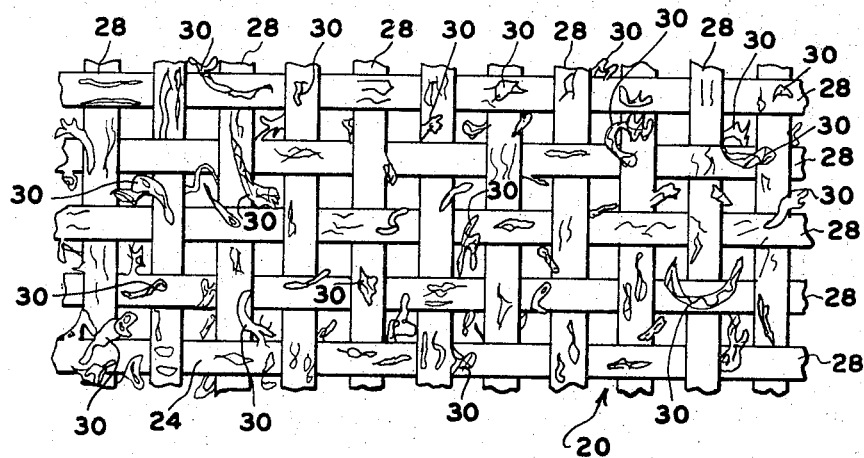
FIG. 5 is a view similar to FIG. 4 but illustrating diagrammatically the filtering material after it has been processed in accordance with the teaching of the present invention.

It has been found that a better filtering action is provided when the inlet surface 24 of the material 20 is processed by sanding or otherwise subjecting it to abrasive action to produce the surface 24 indicated diagrammatically in FIG. 5. Sanding or abrading the inlet surface 24 produces a plurality of jagged pieces of material indicated diagrammatically at 30 in FIG. 5 which tend to catch and collect the foreign matter which would ordinarily pass through the openings in the material 20.

When the cloth 20 is processed in the manner described above it still retains the strength and stability of nylon or other monofilament materials but produces the filtering action of paper or other similar materials. Because of its strength and because the material is processed only on the inlet surface it can be readily cleaned by back flushing.

It is apparent that although I have described but one embodiment of my invention, many changes and modifications can be made therein without departing from the spirit of the invention as expressed by the scope of the appended claims.

I claim:
1. A filter element constructed of strands of a monofilament material joined together to form a porous cloth material having an inlet side and an outlet side, said cloth material having at least the surface on the inlet side roughened to form a plurality of jagged projections and depressions on said inlet side surface of said cloth material adapted to increase the ability of said cloth material to catch and retain foreign particles and to decrease the porosity of said cloth material.

2. In the filter element as defined in claim 1 and in which said monofilament material is nylon.

3. A filter element comprising:
(a) a first supporting member and a second supporting member,
(b) a flexible cloth material carried intermediate said supporting members,
(c) said cloth material being constructed of strands of monofilament material woven together and having a surface exposed to fluid on the inlet side of said filter element and an opposite surface exposed to fluid on the outlet side of said filter element, and
(d) said cloth material having at least the surface on the inlet side roughened to form a plurality of jagged projections and depressions on said inlet side surface of said material adapted to increase the ability of said cloth material to catch and retain foreign particles and to decrease the porosity of said cloth material.

4. The filter element as defined in claim 3 and in which said monofilament material is nylon.

References Cited
UNITED STATES PATENTS

| | | | |
|---|---|---|---|
| 1,035,248 | 8/1912 | Seavey | 210—488 X |
| 2,353,244 | 7/1944 | Dreyfus | 210—499 X |
| 2,478,097 | 8/1949 | Glanzer | 55—528 X |
| 2,612,966 | 10/1952 | Nicol | 55—528 X |
| 2,615,477 | 10/1952 | Crawley | 210—499 X |
| 2,765,923 | 10/1956 | Novak | 210—499 X |
| 2,804,937 | 9/1957 | Poole | 55—527 X |
| 2,820,461 | 1/1958 | Muller | 55—522 X |
| 3,007,579 | 11/1961 | Pall | 210—493 X |
| 3,018,845 | 1/1962 | Powers | 210—499 X |
| 3,280,985 | 10/1966 | Czerwonka | 210—493 X |

SAMIH N. ZAHARNA, *Primary Examiner.*

REUBEN FRIEDMAN, *Examiner.*

C. DITLOW, *Assistant Examiner.*